US007447483B2

(12) United States Patent
Väänänen

(10) Patent No.: US 7,447,483 B2
(45) Date of Patent: Nov. 4, 2008

(54) RADIO APPARATUS AND A METHOD FOR REDUCING INTERFERENCE IN A RADIO APPARATUS

(75) Inventor: Timo Väänänen, Kiiminki (FI)

(73) Assignee: Nokia Corporation, Espoo (FI)

( * ) Notice: Subject to any disclaimer, the term of this patent is extended or adjusted under 35 U.S.C. 154(b) by 715 days.

(21) Appl. No.: 10/776,157

(22) Filed: Feb. 11, 2004

(65) Prior Publication Data

US 2004/0203453 A1 Oct. 14, 2004

(30) Foreign Application Priority Data

Feb. 14, 2003 (FI) ................... 20030232

(51) Int. Cl.
*H04B 1/04* (2006.01)

(52) U.S. Cl. ............... 455/114.1; 455/114.2; 455/113; 455/115.1; 455/115.3; 455/182.1; 455/182.2; 455/192.1; 455/192.2; 455/255; 455/257; 455/260; 455/226.1; 455/226.2; 455/296; 375/376; 375/344; 375/346

(58) Field of Classification Search ......... 455/254–260, 455/314–316, 182.1–2, 192.1–2, 226.1–4, 455/500, 502, 67.11, 13, 114.1–3, 115.1–4, 455/295–296, 113, 67.13; 375/376, 132, 375/136, 137

See application file for complete search history.

(56) References Cited

U.S. PATENT DOCUMENTS

| 5,745,848 A * | 4/1998 | Robin ............ 455/296 |
| 6,163,687 A * | 12/2000 | Scott et al. ........ 455/316 |
| 6,711,229 B1 * | 3/2004 | Harada ............ 375/376 |
| 6,987,794 B1 * | 1/2006 | Kohno et al. ........ 375/136 |

FOREIGN PATENT DOCUMENTS

| EP | 0 416 423 A2 | 3/1991 |
| GB | 2 326 036 A | 12/1998 |
| JP | 09-081261 | 3/1997 |

* cited by examiner

*Primary Examiner*—Tuan A Tran
(74) *Attorney, Agent, or Firm*—Hollingsworth & Funk, LLC

(57) ABSTRACT

The invention relates to a method and an arrangement for reducing interference in a radio apparatus. The solution comprises a clock signal generator, an analog part and a controller arranged to measure interference arising from the harmonic frequencies of the clock signal on the given radio channel, and a controller for controlling the pulse width of the clock signal on the basis of the measurement.

17 Claims, 3 Drawing Sheets

US 7,447,483 B2

RADIO APPARATUS AND A METHOD FOR REDUCING INTERFERENCE IN A RADIO APPARATUS

FIELD

The invention relates to a radio apparatus and to reducing interference arising from a clock signal generated in the apparatus.

BACKGROUND

Modern electronic radio devices use oscillators to generate clock signals needed in several different parts of the devices. For example, phase lock loops, modulators and demodulators and many digital base band components require clock signals.

It is typical for oscillators that in addition to the actual clock signal they also produce different harmonic frequencies. This is a feature of all oscillators. Harmonics are multiples of the actual clock signal frequency. Harmonics caused by clock signals may cause problems in sensitive radio frequency parts in radio devices, such as transceivers in cellular systems. For example, in transceivers of GSM cellular system, VCTCXO Oscillators are widely used (as 13MHz or 26MHz reference clocks, for example). Harmonics arising from the clock signal can be seen as reduced receiver sensitivity on some radio channels or as interference peaks in the receiver band noise spectrum.

Prior art offers some solutions to this problem. The alternatives have been filtering, tuning of the groundings on a printed board (PWB) and maximizing the isolation between the clock and sensitive parts. These solutions have so far provided only partial solution to the problem. It is not possible to isolate the harmonic signals completely from the radio frequency parts. Furthermore, this problem will get worse when development of device design moves towards so called system on chip (SoC) solutions where more and more blocks are placed very close to each other and isolation between noisy and sensitive blocks is reduced.

BRIEF DESCRIPTIONS OF THE INVENTION

An object of the invention is to provide an improved solution to reducing interference in a radio apparatus. According to an embodiment of the invention, there is provided a radio apparatus comprising means for communicating on at least one radio frequency channel, means for generating a clock signal, means for measuring interference arising from the harmonic frequencies of the clock signal on the given radio channel, and means for controlling the pulse width of the clock signal on the basis of the measurement.

According to another embodiment of the invention, there is provided a radio apparatus arranged to communicate on at least one radio frequency channel, comprising a clock signal generator, a radio frequency part and a controller arranged to measure interference arising from the harmonic frequencies of the clock signal on the given radio channel, and a controller for controlling the pulse width of the clock signal on the basis of the measurement.

According to another embodiment of the invention, there is provided an arrangement for reducing interference in a radio apparatus comprising means for communicating on at least one radio frequency channel, and means for generating a clock signal, the arrangement comprising: means for measuring interference arising from the harmonic frequencies of the clock signal on the radio channel, and means for controlling the pulse width of the clock signal on the basis of the measurement.

According to another embodiment of the invention, there is provided a method of reducing interference in a radio apparatus, the method comprising generating a clock signal; measuring interference arising from the harmonic frequencies of the clock signal on a given radio channel, controlling the pulse width of the clock signal on the basis of the measurement.

The method and system of the invention provide several advantages. By adjusting the pulse width of the clock signal the level of the harmonic signals can also be adjusted. Interference peaks in given radio channels can thus be reduced. Requirements for isolation and filtering can also be reduced. Therefore it is also easier to integrate more functionality onto a single chip (SoC). Radio frequency performance is improved in general.

LIST OF DRAWINGS

In the following, the invention will be described in greater detail with reference to the preferred embodiments and the accompanying drawings, in which FIG. 1 illustrates square waves with different pulse widths;

DESCRIPTION OF EMBODIMENTS

Figure 1:
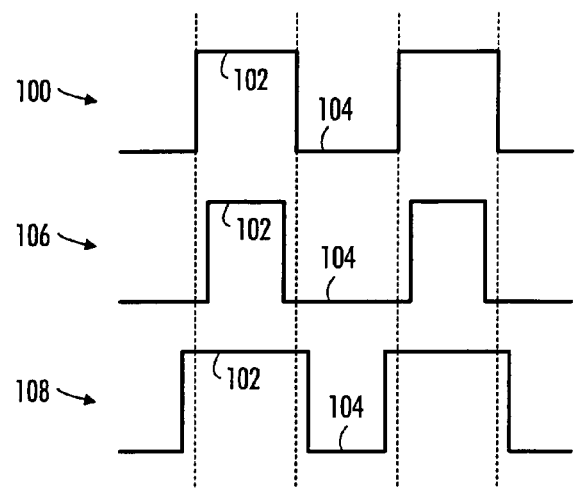

FIG. 1 illustrates square waves with different pulse widths. Clock signals are typically generated as square waves. A square wave 100 has two cycles: a duty cycle 102 when the pulse signal is up and a rest cycle 104 when the pulse signal is down. In the square wave 100 both cycles are of the same length. It can thus be said that the square wave 100 has a duty cycle of 0.5. In a square wave 106 the duty cycle 102 is shorter compared with the rest cycle 104 The duty cycle of the square wave 106 is in this case smaller than 0.5. Respectively, as in the square wave 108 the duty cycle 102 is longer compared with the rest cycle 104, the duty cycle of the square wave 108 is greater than 0.5.

Figure 2A:
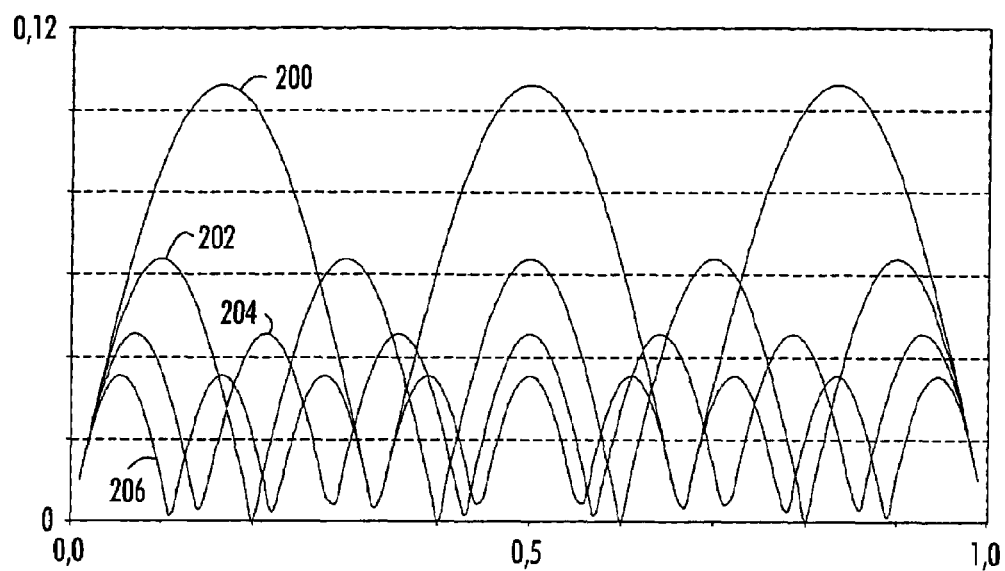
FIGS. 2A and 2B illustrate the levels of some harmonics.
Figure 2B:
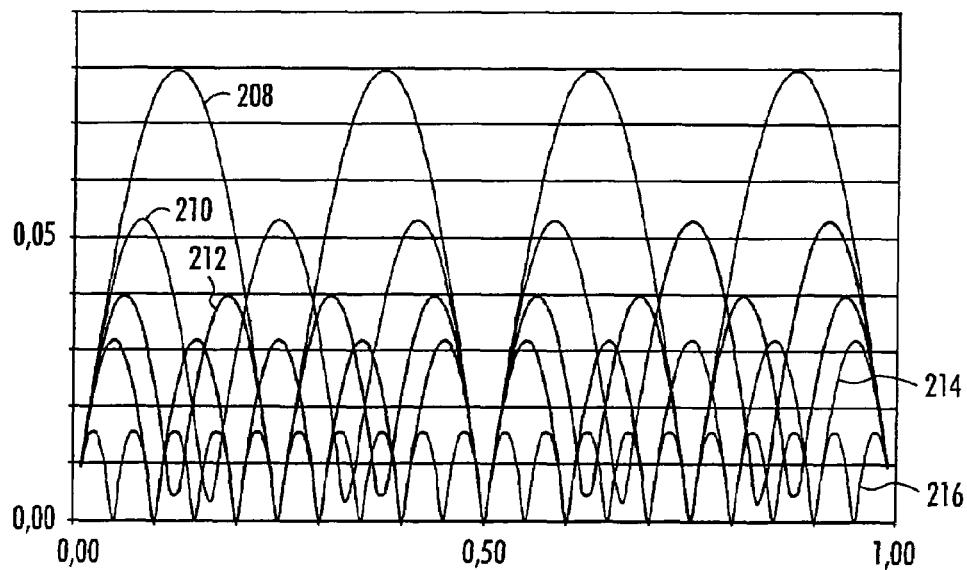

The harmonics of a square wave signal are dependent on the pulse width or the duty cycle of the signal. For example, a 0.5-duty-cycle signal has only odd harmonic frequencies. In FIGS. 2A and 2B the levels of some harmonics are presented based on Fourier transform of an asymmetric pulse train. Fourier coefficients for asymmetric pulse train can be calculated as $$|X_n| = \frac{A\tau}{T_0}|\operatorname{sin}c(nf_0\tau)|, n = 0, \pm 1, \pm 2, \ldots,$$

where $\tau$=pulse width, $T_0$= signal period. A denotes signal amplitude and $f_0$ denotes frequency. FIG. 2A presents odd harmonics as a function of the pulse width. The x-axis shows the duty cycle from 0.0 to 1.0 and the y-axis shows the Fourier coefficients for odd harmonic frequencies. The figure illustrates $3^{rd}$ harmonics 200, $5^{th}$ harmonics 202, $7^{th}$ harmonics 204 and $9^{th}$ harmonics 206.

Respectively, FIG. 2B presents even harmonics as a function of the pulse width. The figure illustrates $4^{th}$ harmonics 208, $6^{th}$ harmonics 210, $8^{th}$ harmonics 212, $10^{th}$ harmonics 214 and $20^{th}$ harmonics 216.

It can be seen that the level of harmonics is changed in respect to the pulse width. The frequency of the notches increases with higher order harmonics. The duty cycle of 0.5 gives minimum level for all even harmonics.

Figure 3:
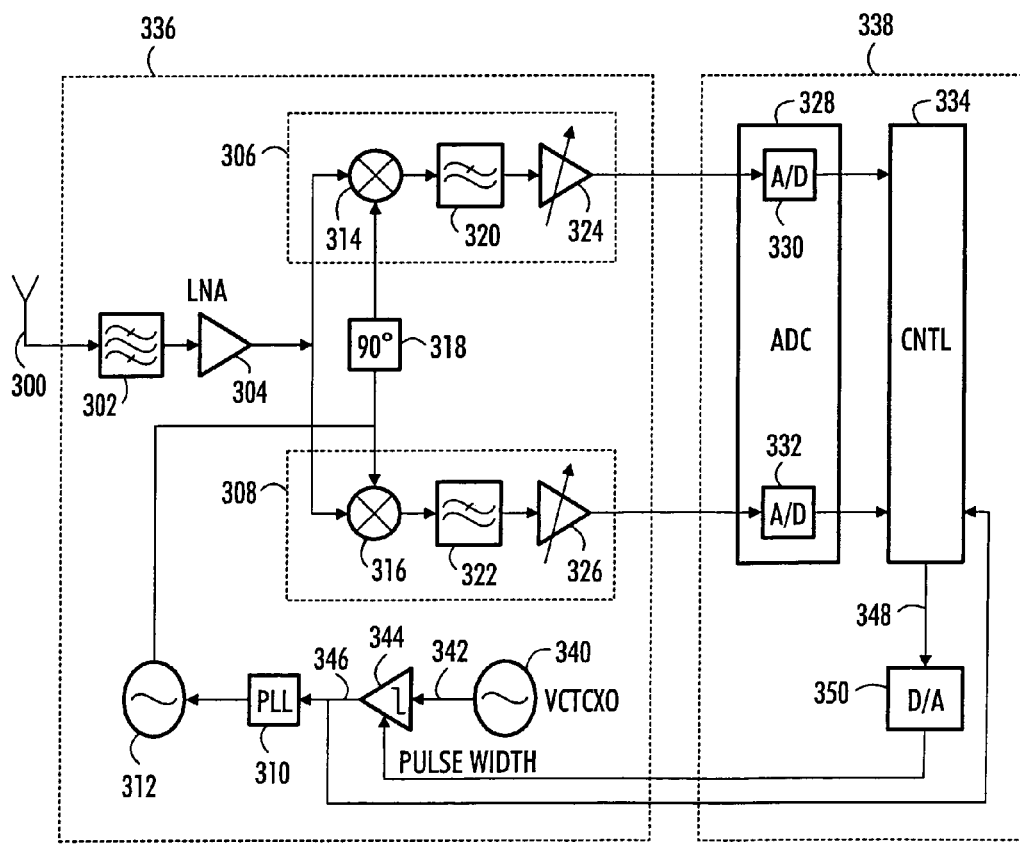
FIG. 3 illustrates an example of a radio apparatus.

FIG. 3 illustrates an example of a radio apparatus applying an embodiment of the invention. The apparatus comprises an analog part 336 and a digital part 338. The apparatus comprises an antenna 300, which receives a signal, which is taken to a band pass filter 302 and a low noise amplifier 304. The signal at the output of the amplifier is divided into two branches 306, 308. The receiver comprises a phase lock loop 310, which controls a voltage-controlled oscillator 312. The output of the oscillator is forwarded to a mixer 314 of the branch 306 via a phase shifter 318 and directly to a mixer 316 of the branch 308. In the mixers 314, 316 the signal from the output of the amplifier 304 is multiplied by the oscillator signal, thus performing a down-conversion to an intermediate or a base band frequency. From the mixers the down-converted signal is taken to low pass filters 320, 322, and to amplifiers 324, 326. The amplified signals are taken to a converter 328, where the signals from the branches are converted to the digital form in analogue-to-digital converters 330, 332.

From the converter 328 the digital signals are forwarded to a digital controller 334. The controller further processes the received signals. The controller also controls the operation of the receiver. The apparatus is able to communicate on different radio channels. The controller 334 may control the operation of the voltage-controlled oscillator via the phase locked loop in such a way that the desired radio channel frequency is down-converted in the mixers 314, 316. The controller may be realized using a digital signal processor, a general processor or discrete components, and suitable software.

The apparatus described above may also comprise a transmitter part. However, these are not described for simplicity. The apparatus may thus be a receiver, a transmitter or a transceiver.

The apparatus comprises at least one oscillator 340, which generates a clock signal. The generated clock signal 342, which at the output of the oscillator 340 is typically a sinusoidal signal, is taken to a buffer 344, which converts the signal into a square wave format. The square wave clock signal 346 is taken to the phase lock loop 310 and the controller 334 as an in put signal.

In an embodiment of the invention the controller 334 of the apparatus controls the pulse width of the clock signal. The digital control signal 348 of the converter is converted into an analog form in a D/A-converter 350 and the output of the converter 350 is connected to the buffer 344.

Figure 4:
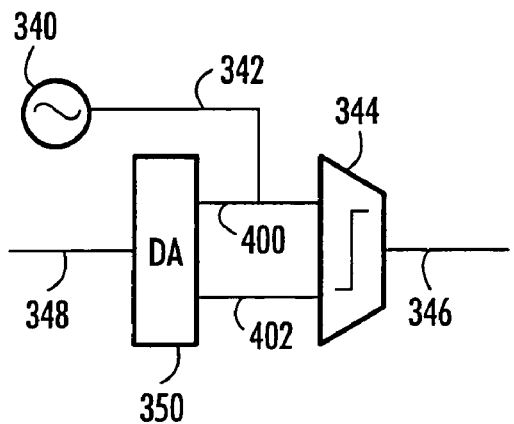
FIG. 4 illustrates an example of a pulse width control.

FIG. 4 illustrates an example of the buffer control, where the pulse width is implemented by changing an offset in the buffer input. The output signal 342 from the oscillator 340 is taken to the buffer 344 as an input. The D/A-converter 350 receives a control signal 348 from the controller. The signal level indicated by the signal corresponds to an offset voltage of the buffer. The D/A converter outputs an analogue offset signal in a differential form 400, 402 to the buffer 344. The differential form comprises the required offset voltage $O_o$ in a positive and negative form ($+O_o$ and $-O_o$). The buffer converts the sinusoidal oscillator signal 342 into a square wave 346.

The offset voltage control may also be implemented in a single ended form, where the D/A-converter 350 outputs only one voltage value $+O_o$, which is taken against common ground voltage.

Figure 5:
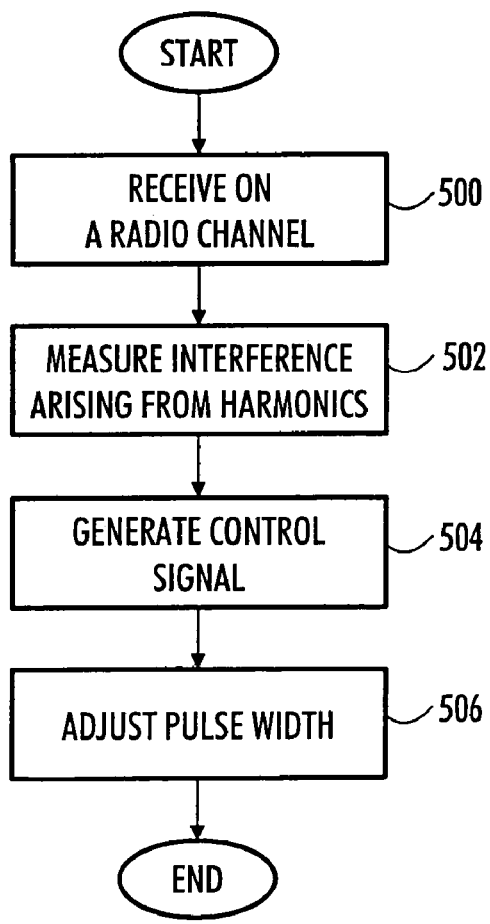
FIG. 5 illustrates a flowchart of an embodiment.

FIG. 5 illustrates a flowchart of an embodiment of the invention applied in a receiver apparatus. First, in step 500, the receiver tunes to a radio channel and starts reception on the channel. Tuning means, in this case, changing the output frequency of the voltage-controlled oscillator 312 to the given frequency. Next, the receiver measures the interference arising from the harmonics on the given channel. In an embodiment of the invention no actual signal is transmitted on the radio channel at the time of the measurement. The received signal thus basically comprises noise. The received signal is processed normally in the receiver, that is, filtered, amplified, divided into two branches, and processed in the branches as described above.

The digitized signal from the output of the converter 328 is taken into the base band controller 334, which is arranged to detect interference peaks in the signal in step 502. On the basis of the found interference peaks the controller generates 504 a control signal 348 for the pulse width control. The signal is then converted to an analog signal in the converter 350 and passed to the clock signal buffer 344 where the pulse width of the signal is adjusted 506 on the basis of the signal.

This measurement and control process may be repeated iteratively until the interference peaks have been sufficiently eliminated. In an embodiment of the invention the controller may have reference thresholds, below which the interference peaks should be adjusted.

In an embodiment the above-described measurement and control process is performed each time before the radio apparatus begins communication on a given radio channel. For example, the control process may be performed before the radio apparatus begins a phone call on the given frequency.

In an embodiment, where the communication uses a frame structure, such as the frame structure of the GSM cellular system (Global System for Mobile communication), the above described measurement and control process is performed before each frame. Thus the interference arising from the harmonics may be efficiently kept below the desired limits. Performing the control on a frame-by-frame basis has the advantage that the frequency hopping used in GSM systems does not disturb the control process.

Even though the invention is described above with reference to an example according to the accompanying drawings, it is clear that the invention is not restricted thereto but it can be modified in several ways within the scope of the appended claims.

The invention claimed is:

1. A radio apparatus comprising
   means for communicating on at least one radio frequency channel,
   means for generating a clock signal at a frequency,
   means for measuring interference arising from harmonic frequencies of the clock signal on a given radio channel, and
   means for controlling the pulse width of the clock signal at the frequency on the basis of the measurement.

2. The radio apparatus of claim 1, comprising means for measuring the signal strength on the given radio channel and means for determining peaks in the signal strength.

3. The radio apparatus of claim 1, wherein the apparatus is arranged to control the pulse width of the clock signal whenever the apparatus begins communication on a given radio channel.

4. The radio apparatus of claim 1, wherein the apparatus is arranged to communicate on a radio channel, using a predetermined frame structure and wherein the apparatus is arranged to control the pulse width of the clock signal on a frame-by-frame basis.

5. The radio apparatus of claim 1, wherein the apparatus is a radio transceiver of a cellular radio system.

6. A radio apparatus arranged to communicate on at least one radio frequency channel, comprising
   a clock signal generator, an analog part and a digital part arranged to measure interference arising from harmonic frequencies of the clock signal on a given radio channel, and a controller for controlling the pulse width of the clock signal while maintaining the clock signal frequency on the basis of the measurement.

7. The radio apparatus of claim 6, wherein an output of the controller is connected to the input of a digital-to-analog converter, which output controls the pulse width of the clock signal.

8. The radio apparatus of claim 6, wherein the apparatus is arranged to control the pulse width of the clock signal whenever the apparatus begins communication on a given radio channel.

9. The radio apparatus of claim 6, wherein the apparatus is arranged to communicate on a radio channel, using a predetermined frame structure and wherein the apparatus is arranged to control the pulse width of the clock signal on a frame-by-frame basis.

10. The radio apparatus of claim 6, wherein the apparatus is a radio transceiver of a cellular radio system.

11. An arrangement for reducing interference in a radio apparatus that communicates on at least one radio frequency channel and generates a clock signal at a frequency, the arrangement comprising:

an analog part and a digital part arranged to measure interference arising from harmonic frequencies of the clock signal on a given radio channel, and a controller for controlling the pulse width of the clock signal at the frequency on the basis of the measurement.

12. A method of reducing interference in a radio apparatus, the method comprising generating a clock signal at a frequency;

measuring interference arising from harmonic frequencies of the clock signal on a given radio channel, controlling the pulse width of the clock signal while maintaining the clock signal frequency on the basis of the measurement.

13. The method of claim 12, further comprising:

measuring the signal strength on the given radio channel;

determining peaks in the signal strength.

14. The method of claim 13, further comprising:

determining the peaks arising from the harmonic frequencies of the clock signal on the given radio channel, controlling the pulse width of the clock signal to minimize said peaks.

15. The method of claim 12, wherein controlling the pulse width includes controlling the pulse width on a given radio channel prior to starting communication on that channel.

16. The method of claim 12, wherein the radio apparatus communicates on a radio channel, using a given frame structure.

17. The method of claim 16, wherein controlling the pulse width includes controlling the pulse width on a given radio channel prior to each frame used in the communication.

* * * * *